(12) United States Patent
Fan

(10) Patent No.: US 8,996,613 B2
(45) Date of Patent: Mar. 31, 2015

(54) AUTOMATED ACTIVITY CREATION IN A MOBILE DEVICE BUSINESS APPLICATION

(75) Inventor: Yang-cheng Fan, San Jose, CA (US)

(73) Assignee: SAP SE, Walldorf (DE)

(*) Notice: Subject to any disclaimer, the term of this patent is extended or adjusted under 35 U.S.C. 154(b) by 45 days.

(21) Appl. No.: 13/329,082

(22) Filed: Dec. 16, 2011

(65) Prior Publication Data

US 2013/0159386 A1 Jun. 20, 2013

(51) Int. Cl.
*G06F 15/16* (2006.01)
*G10L 15/26* (2006.01)

(52) U.S. Cl.
CPC .................... *G10L 15/265* (2013.01)
USPC ......................................................... 709/203

(58) Field of Classification Search
CPC ... G06Q 30/02; H04L 12/1407; G10L 15/265
USPC ................................................ 709/206, 203
See application file for complete search history.

(56) References Cited

U.S. PATENT DOCUMENTS

| | | | |
|---|---|---|---|
| 6,970,831 B1* | 11/2005 | Anderson et al. | 705/7.32 |
| 2002/0118815 A1* | 8/2002 | Andersen | 379/265.02 |
| 2002/0152179 A1* | 10/2002 | Racov | 705/67 |
| 2007/0027803 A1* | 2/2007 | Brandes et al. | 705/39 |
| 2009/0019372 A1* | 1/2009 | Chu et al. | 715/748 |
| 2009/0210516 A1 | 8/2009 | Roskowski | |
| 2009/0282336 A1* | 11/2009 | Lindley et al. | 715/716 |
| 2009/0299793 A1* | 12/2009 | Guzel | 705/8 |
| 2011/0238557 A1* | 9/2011 | Barry | 705/37 |
| 2012/0022957 A1* | 1/2012 | Sun et al. | 705/16 |
| 2012/0130763 A1* | 5/2012 | Katz | 705/7.14 |
| 2012/0284195 A1* | 11/2012 | McMillen et al. | 705/71 |
| 2013/0103539 A1* | 4/2013 | Abraham et al. | 705/26.8 |
| 2013/0115872 A1* | 5/2013 | Huang et al. | 455/3.01 |
| 2013/0144717 A1* | 6/2013 | Williams et al. | 705/14.53 |

\* cited by examiner

*Primary Examiner* — Hamza Algibhah
(74) *Attorney, Agent, or Firm* — Fountainhead Law Group PC

(57) ABSTRACT

A mobile device logs communications with other communication devices by automatically logging the communication details with a business application backend server. The mobile device executes a client-side business application and coordinates with the backend server to ensure that communication logs are stored on the backend server and associated with customer accounts maintained by the backend server.

20 Claims, 6 Drawing Sheets

AUTOMATED ACTIVITY CREATION IN A MOBILE DEVICE BUSINESS APPLICATION

BACKGROUND

The present invention relates to business applications and in particular to tracking activity on a mobile device executing a business application.

Unless otherwise indicated herein, the approaches described in this section are not prior art to the claims in this application and are not admitted to be prior art by inclusion in this section.

Mobile devices such as smart phones and computer tablets (e.g., Apple® iPad® computer) have sufficient capacity in terms of processing power and data storage to execute increasingly complex business applications. For example, a customer relationship management (CRM) business solution, such as Sales On-Demand developed and licensed by the applicant provides mobile device capable client applications that can access the main data store of CRM data stored and managed by a server-side component of the CRM system. Sales people have access to the CRM database remotely via their mobile devices, allowing them to transact business with the customers in the field. An important aspect of their work is being able track their various activities in order to provide the best customer service that they can.

SUMMARY

A method for a mobile device includes executing a client-side business application. The client-side business application establishes a connection with a corresponding server-side business application. A user of the mobile device may log onto the business application. and then navigate to a page within the business application. The user may then initiate a call to a customer contact, which may include the client-side business application sending communication details to the server, where a business object associated with the customer is instantiated. The communication details may be stored in the instantiated business object and stored in a suitable data store. In some embodiments, the mobile device can work in an offline mode without connecting to the server. In the case of offline mode, the mobile device can create the business object locally in the mobile device database. Once the mobile device is connected to the server, it can sync the deltas, or changes made, during offline mode to the server.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
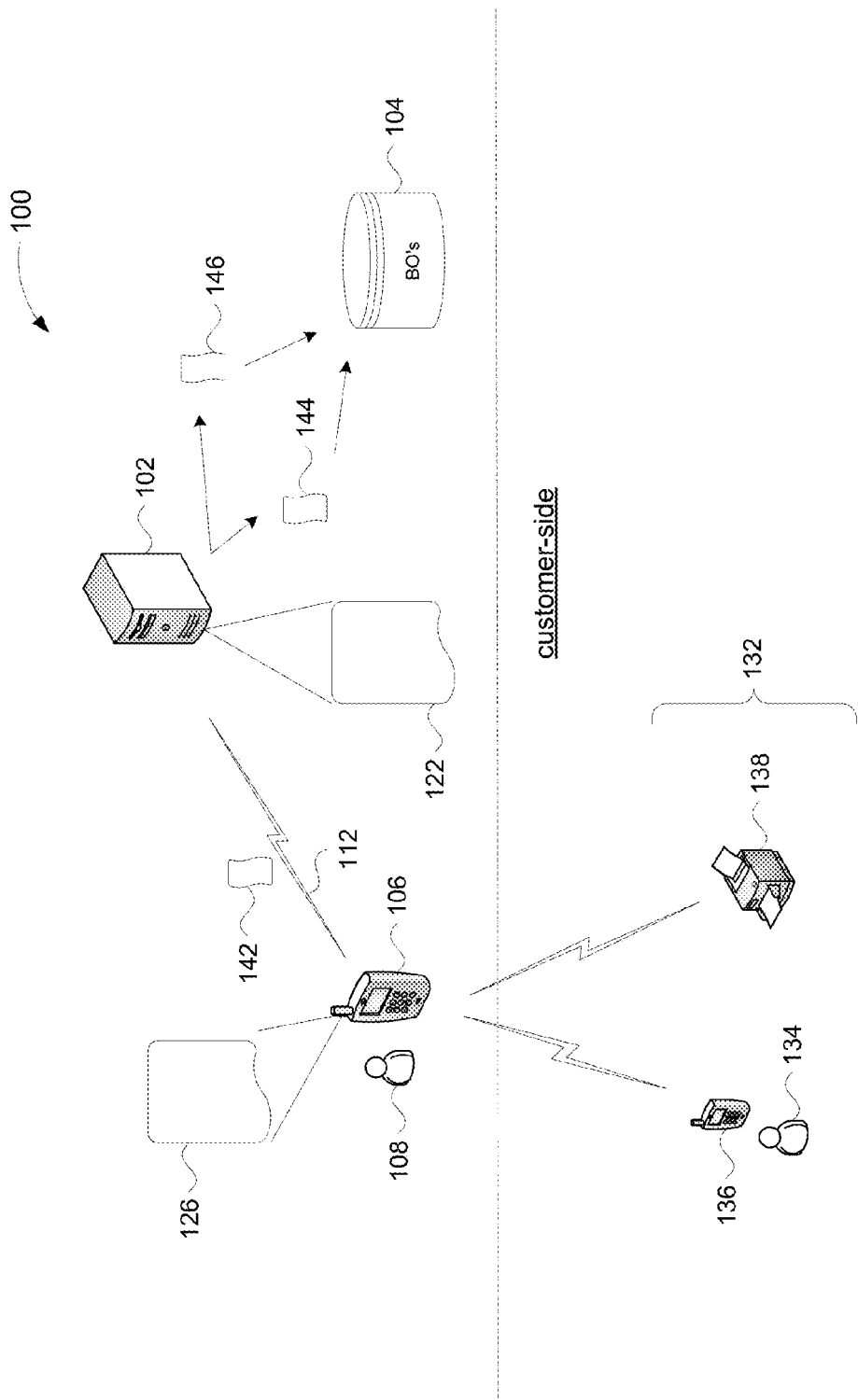
FIG. 1 is a generalized system block diagram illustrating elements in accordance with the present invention.

FIG. 1 shows a business application system 100 in accordance with embodiments of the present invention. The business application system 100 may include a server component 102 connected to a database system 104. A mobile device 106 may be configured with a client-side business application 126. The server component 102 is configured with a server-side business application 122 (e.g., a CRM application) in order to provide customer support services to a sales group in a business enterprise. The data base 104 may comprise the data records of customers of the business enterprise.

The client-side business application 126 mobile device 106 allows a user (e.g., salesperson) 108 to access the backend server component 102 over a suitable communication link 112 (e.g., cellular telephone network, Internet, and so on) with their mobile device 106. The user 108 may contact their customers using their mobile device 106. For example, the user 108 may contact a customer 134 on their mobile device 136 or laptop computer, and so on. The user 108 may call the customer 134, using a conventional cellular telephone network, Skype, Apple® Facetime, and so on. The user 108 may send a text message (e.g., using the Short Messaging Service, SMS). The user 108 may initiate a communication via social networking channels such as Facebook, Twitter, Linkedin, and so on. Instead of speaking directly with the customer 134, the user 108 may send a message to some other suitable communication device 138 of the customer 134; e.g. a fax machine, email, and the like. Still other forms of communication may be employed.

In accordance with principles of the present invention, customer communications are tracked and stored by the server component 102 in the data base 104. In embodiments, the mobile device 106 (executing the client-side business application 126) may send communication related messages 142 to the server component 102 relating to communication activities with the user 108. The server component 102 may create a business object instance 144, 146 for each such communication activity. In an embodiment, for example, if the user calls a customer 134, details of the communication may be stored in a business object (e.g., 144) in order to log the communication activity.

Figure 2:
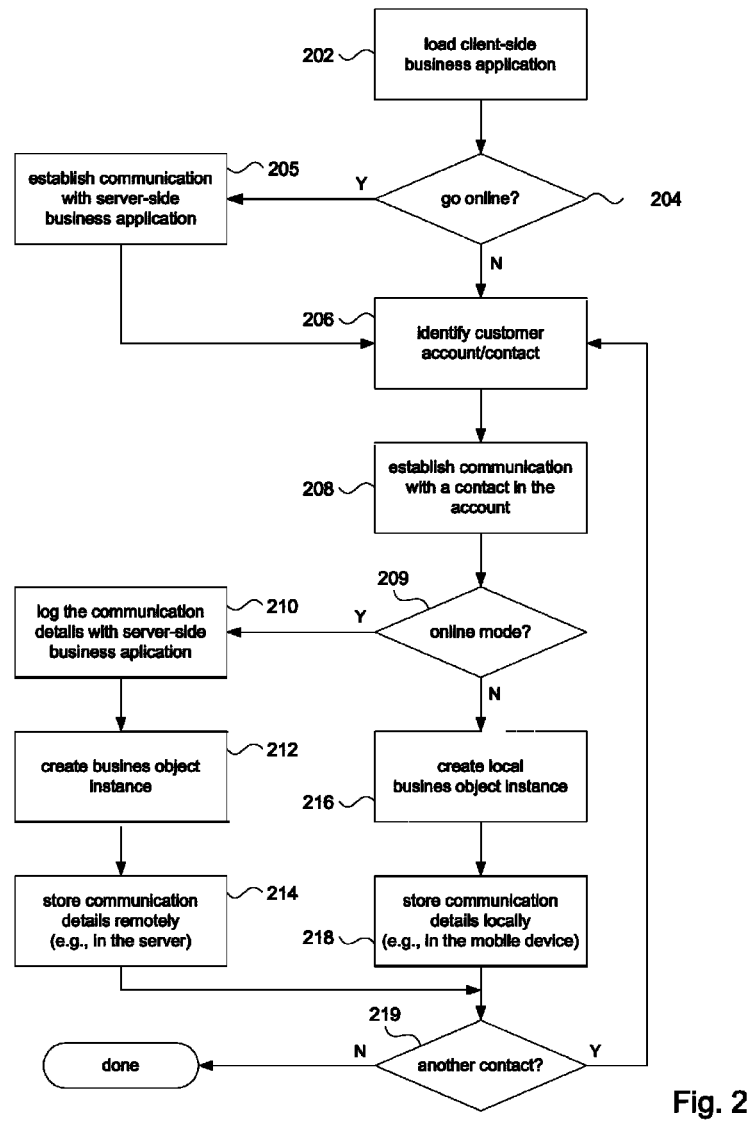
FIG. 2 is a high level flow chart describing processing between a mobile device and a backend server in accordance with embodiments of the present invention.

Referring to FIG. 2, a flow chart shows processing in the mobile device 106 and in the server component 102 in accordance with embodiments of the present invention. In a step 202, the client-side business application 126 may be executed by the mobile device 106. In a step 204, the client-side business application 126 determines whether to operate in online mode or offline mode. For example, the user 108 may be prompted whether or not to connect to the server-side business application 122. If the user 108 decides to work "offline", then a connection to the server-side business application 122 is not made (e.g., setting a flag) and some indication is made that the client-side business application 122 is operating in an offline mode of operation. Processing may then proceed with a step 206.

If the user 108 decides to go "online", then processing proceeds to a step 205. The client-side business application 126 attempts to establish a communication channel with the server component 102, which may include exchanging a series of messages with the server-side business application 122 in order to establish a communication channel with the server component 102. For example, a secure communication channel may need to be established in order to protect confidential information that may be passed between the server component 102 and the mobile device 106. A login sequence may be initiated, requiring input from the user 108, and so on. If the login sequence is successful (i.e., logged in), then some indication is made that the client-side business application 122 is operating in an online mode of operation. If the mobile device 106 is not able to communicate with the server component 102, or the client-side business application 122 is not able to establish communication with the server-side business application 126, then an indication is made that the client-side business application 122 is operating in an offline mode of operation.

Once logged in, the user 108 may access the server-side business application 122 (e.g., a CRM system). Processing may then continue with step 206. In some embodiments, all, some, or no portions of the database information in the database 104 of the server component 102 may be downloaded to the mobile device 106 when the mobile device has established communication with the server component 102. Having the database 104 (or portions of it) on the mobile device 106 may reduce communication overhead, and allow for working offline. However, the amount of data (if any) from the database 104 that is downloaded to the mobile device may depend on factors such as security concerns, company policies, government regulations, and so on.

If the user 108 has successfully gained access (e.g., logged in) to the server component 102, the user may interact with the server-side business application 122. In embodiments, the client-side business application 126 may present various user interface displays to allow the user 108 to access different functions provided by the server-side business application. For example, in a CRM business application, the user 108 may access a customer account to check on the status of open orders, to address billing issues, to enter new orders, and so on. If the user 108 is offline, they can only access whatever customer account information is available on the mobile device 106. As explained above, in various embodiments, the mobile device 106 may store all, some, or no customer information from the server component 102. Nonetheless, the client-side business application 126 may have some type of address book of customer contact information that the user 108 may access.

In a step 206, a customer account is identified, and one or more contact people for that customer is identified. This may accomplished in any manner. For example, after the user 108 logs on, the client-side business application 126 may prompt the user for a customer account number, at which time a customer account has been identified; this customer is referred to herein as the "active customer." If the user 108 is offline, then there may not be an active customer if the mobile device does not have a local data store of customer account information.

The user 108 may navigate the client-side business application 126 to identify a customer contact. For example, the client-side business application 126 may have a "customer contacts" display which lists contacts for the active customer. The user 108 may select one or more contacts from the list. Different displays presented by the client-side business application 126 for the active customer may include contact information specific to that display. For example, suppose there is an "accounts receivable" display. The display may list various customer invoices that are still open. The "accounts receivable" display may include contact information for the active customer's accounting department that the user 108 may select. If the user 108 is offline, then they may only have access to the address book of customer contacts.

In some embodiments, the client-side business application 126 may allow the user 108 to make a "call" from within the application. For example, the client-side business application 126 display user-selectable graphical elements (e.g., a "communication bar" comprising a series of icons displayed at the bottom of the display area) that the user 108 can select to place a telephone call, a graphic for Skype to make a Skype® call, a graphic for Facebook, Twitter, and so on.

In a step 208, the user 108 may establish communication with a customer contact. If the mobile device 106 is configured with a touch sensitive screen, then the user 108 may simply "tap" on an area in a display to which they navigated to trigger the mobile device to establish communication. In accordance with the present invention, the client-side business application 126 makes note of this event, for example, by storing the time of day when the user 108 initiated a communication, the mode of the communication (e.g., telephone call, Skype, text messaging, and so on), and the contact information (e.g., telephone number, Skype ID, and so on). Other information may include the date, the user's location (e.g., if the mobile device 106 has GPS capability), and so on.

The idea of "establishing" a communication may include the user 108 receiving incoming communications (e.g., calls, text messages, and so on), in addition to the user 108 initiating the communication. For an incoming communication, the initiator of the communication may or may not be associated with the active customer account. Accordingly, in embodiments, the client-side business application 126 may receive an identification of an initiating caller (e.g., caller ID). The identification may be mapped by the client-side business application 126 to a customer account. For example, the client-side business application 126 may maintain a master contact list that maps contact information of individuals with a customer account. The mapped customer account becomes the "active customer" for the incoming communication. It will be appreciated that the incoming communication may be a telephone call, a text message, a Skype® call, and so on.

In an embodiment, if the initiating caller cannot be mapped to a customer account, then the client-side business application 126 may display a list of customers (e.g., listed by customer name, customer account number, and so on), and prompt the user 108 to select one of the listed customers. The selected customer becomes the "active customer" for the incoming communication. In an embodiment, an "ignore" choice can be displayed and may be selected, if the user 108 determines that the initiating caller is not associated with any of their customers (e.g., the initiating caller is a friend).

The client-side business application 126 may track the duration of the call, and make a note of the duration of the call at the conclusion of the communication. Also, at the conclusion of the communication, the client-side business application 126 may prompt the user 108 to enter any notational information that the user may desire to associate with the communication. The foregoing information relating to the communication may be collectively referred to as the "communication details." In some embodiments, the communication detail may include at least some of the actual communication, including audio data, video data, textual data, and so on. It will be appreciated that applicable laws, regulations, and policies concerning privacy will need to be adhered to when record all or portions of a communication.

If the user 108 is online (decision step 209), the in a step 210, the client-side business application 126 may communicate with the server-side business application 122 in order to associated the communication details with the active customer. In an embodiment, the client-side business application 126 may send one or more messages to the server component 102 which include the customer account information and the communication details. In a step 212, the server-side business application 122 may instantiate a business object that is associated with the customer and store the communication details in the instantiated business object. The business object may then be stored in the database 104 (step 214) along with the data for the active customer.

In a step 219, the user 108 may repeat the foregoing steps. The user 108 may navigate to another display for the active customer (e.g., a display of open orders), and make another call. The user 108 may select another customer and repeat the process, and so on.

Returning to decision step 209, if the user 108 is offline, then the client-side business application 126 may instantiate (step 216) a local business object that is associated with the customer and store the communication details in the instantiated local business object. The local business object may then be stored (step 218) in a memory of the mobile device. Returning to step 204, as part of successfully logging on to the server-side business application 122, the client-side business application 126 can sync (upload) any local business objects that were instantiated when the mobile device 106 was offline with the server-side business application. In this way, offline communications will eventually get synced up to the server 102.

Figure 3:
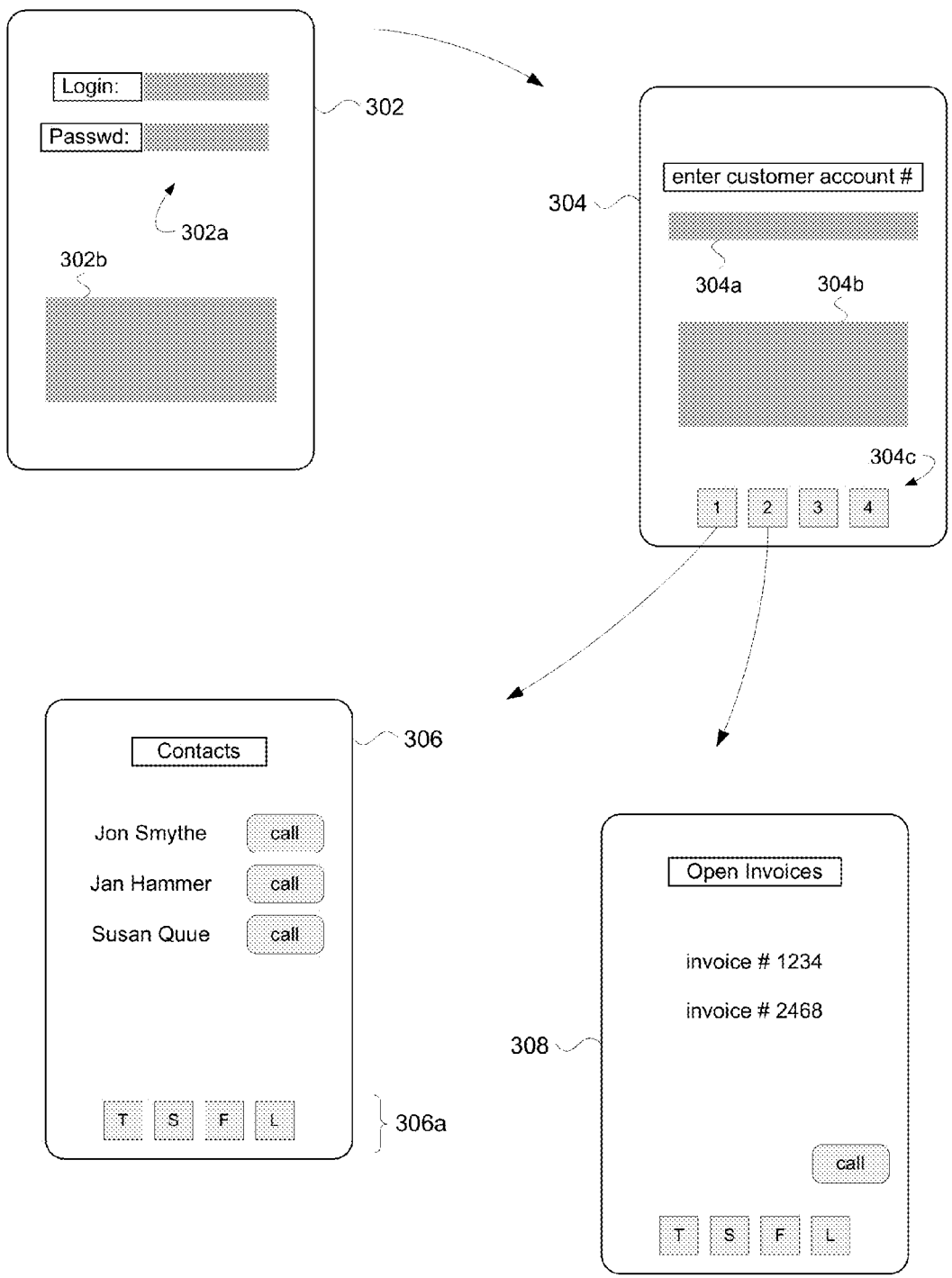
FIGS. 3-5 illustrate various displays presented by a mobile device in accordance with aspects of the present invention.
Figure 4:
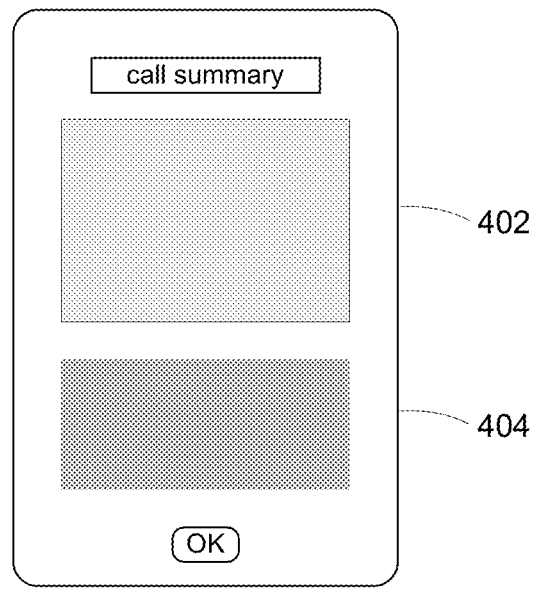
Figure 5:
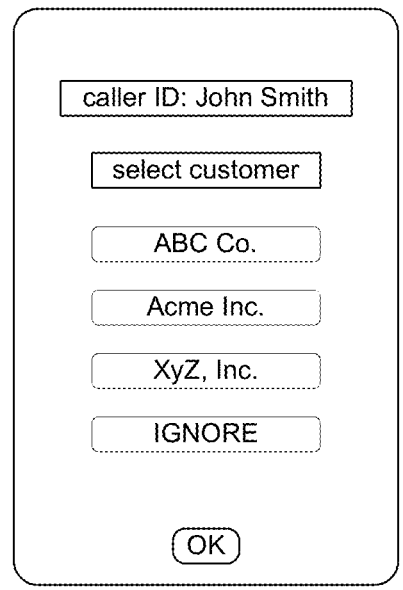

Some illustrative displays on a mobile device (e.g., 106, FIG. 1) presented by an embodiment of the client-side business application 126 are shown in FIGS. 3-5. The mobile device 106 may be configured with a touch sensitive screen so that user input may be provided by simply "tapping" on areas of the screen.

FIG. 3 shows an example of a login display 302, where the user 108 may enter their login name and password in a data entry area 302a. A virtual keyboard 320b may be displayed for data entry, or in some embodiments the mobile device 106 may be configured with a physical keyboard (not shown). When the user 108 has successfully logged in, the client-side business application 126 may present a display 304 to prompt the user to select a customer account. The user 108 may enter an account identifier in the input field 304a, for example, via a virtual keyboard 304b. Alternatively, the client-side business application 126 may display a list of customers (not shown), and allow the user 108 to select a customer from the list. The display 304 may include navigation buttons 304c that can take the user 108 to different displays within the client-side business application 126. FIG. 3 shows four navigation buttons 304c labeled "1", "2", "3", and "4". For example, if the client-side business application 126 is a CRM application, the navigation button labeled "1" may display a contacts screen 306, the navigation button labeled "2" may display an open invoices screen 308, and so on. Some displays (e.g., 306) may include a series of buttons 306a for placing a telephone call ("T" button), a Skype® call ("S" button), and so on.

FIG. 4 illustrates a display for annotating a communication. In some embodiments, a display such as illustrated in FIG. 4 may be presented to the user 108 at the conclusion of a communication. The user 108 may enter their comments and any other information in a data entry area 402 via a keyboard 404. As explained above in FIG. 2, the user's annotations can then be logged to the server component 102 along with other information relating to the communication.

FIG. 5 illustrates a display that may be presented to the user 108 when an incoming communication is received. The screen may present an identifier of the initiating caller on the screen and a present a list of customers that the initiating caller may be associated with. The display may include a button that informs the client-side business application 126 to simply ignore this initiating caller and not to log the call to the server component 102. For example, the incoming call may be a personal call, or is not otherwise associated with a customer.

Figure 6:
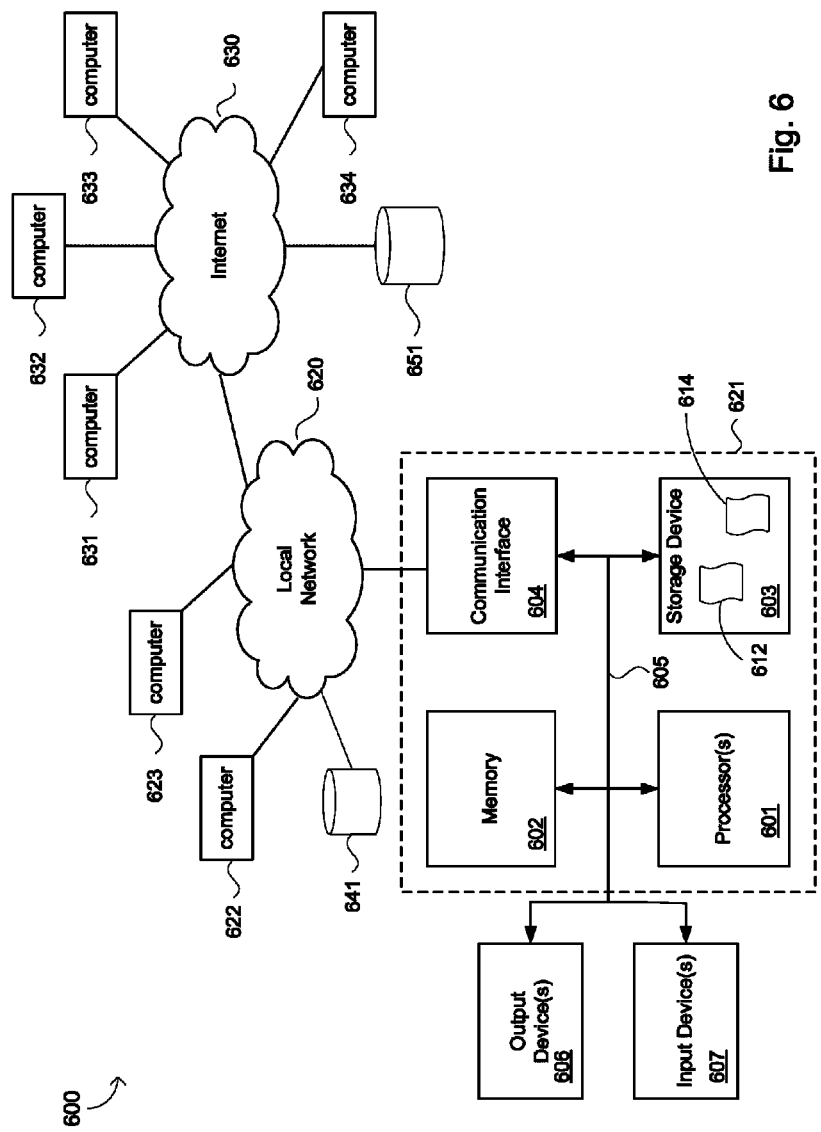
FIG. 6 is a block diagram illustrating a backend server system.

FIG. 6 is a block diagram of a system 600 according to some embodiments. The system 600 includes computers 621-623 and one or more storage systems 641 interconnected by a local network 620 such as a Local Area Network (LAN), a Wide Area Network (WAN), and the like. In some embodiments, the system 600 may include computers 631-634 and one or more storage systems 651 connected to the Internet 630. The local network 620 may be connected to the Internet 630.

Each computer (e.g., computer 621) may be configured as a general purpose computing apparatus and may execute program code to perform any of the functions described herein. For example, computer 621 may be the server component 102.

Each computer (e.g., computer 621) includes, among its components, a processor component 601 (comprising one or more processing units) operatively coupled to a communication interface 604, a data storage device 603, one or more input devices 607, one or more output devices 606, and a memory 602. The communication interface 604 may facilitate communication on the on local network to access other systems, such as storage system 641 for example.

Input device(s) 607 may include, for example, a keyboard, a keypad, a mouse or other pointing device, a microphone, knob or a switch, an Infra-Red (IR) port, a docking station, a touch screen, and so on. Input device(s) 607 may be used, for example, to enter information into the computer. Output device(s) 606 may include, for example, a display (e.g., a display screen), a speaker, a printer, and so on. Additional elements (not shown) may be including according to some embodiments.

The data storage device 603 may comprise any appropriate persistent storage device, including combinations of magnetic storage devices (e.g., magnetic tape, hard disk drives and flash memory), optical storage devices, Read Only Memory (ROM) devices, etc., while memory 602 may comprise Random Access Memory (RAM).

The data storage device 603 may store program code 612 (e.g., server-side business application 122) which may be executed by the processor component 601 to cause the computer to perform any one or more of the processes and methods described herein. For example, the data storage device 603 may include the database 104 of business objects. In embodiments, the database 104 may be provided by a storage server 641.

The data storage device 603 may store data structures 614 such as object instance data, runtime objects, and any other data described herein. The data storage device 603 may also store data and other program code for providing additional functionality and/or which are necessary for operation thereof, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), HyperText Transfer Protocol (HTTP) and Wireless Application Protocol (WAP).

Figure 7:
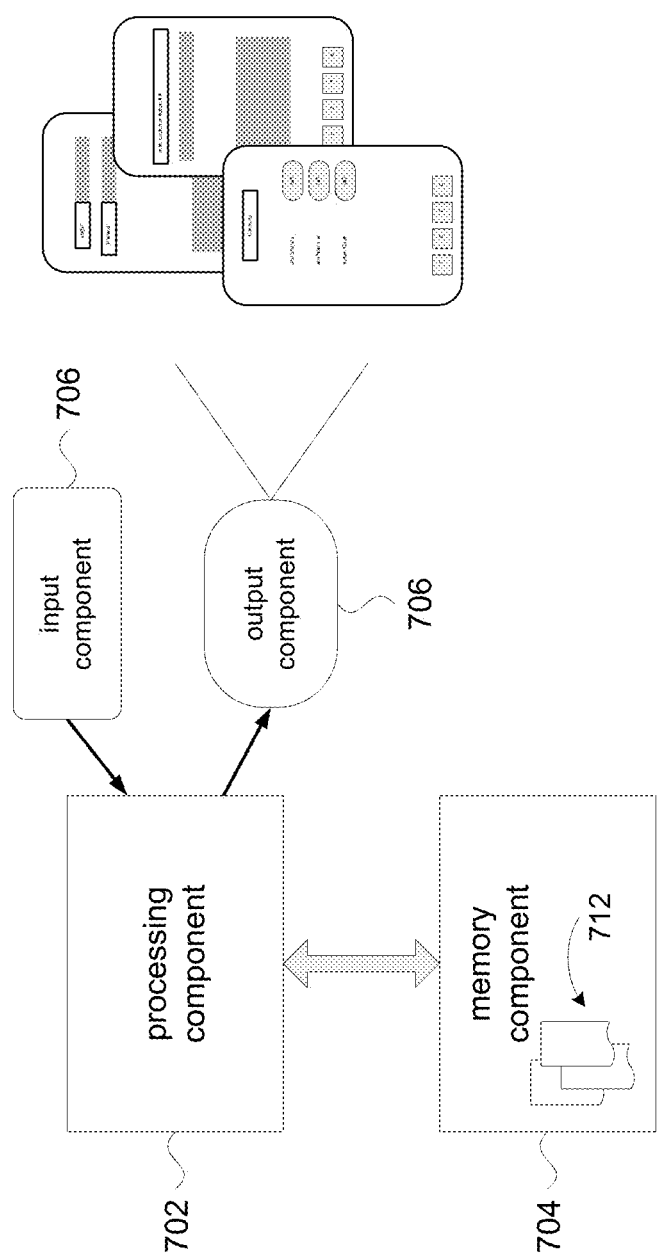
FIG. 7 is a block diagram of a mobile device in accordance with the present invention.

FIG. 7 shows some details of a mobile device (e.g., 106) in accordance with the present invention. A processing and control component 702 provides the various computing and communication functions. A memory component 704 (e.g., Flash memory) may have stored thereon various data 712, including the client-side business application 126. An output component 706 may comprise a touch-sensitive screen for various displays. An input component 708 may include a physical keyboard.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method on a mobile device comprising:
executing a client-side business application on a mobile device;
responsive to an initiation of an audio conversation through the mobile device by a business user associated with the mobile device to a customer associated with a communication device separate from the mobile device,
exchanging first messages between the business user of the mobile device and a server-side business application executing on a computer system separate from the mobile device, the first messages including identification information previously provided by the business user of the mobile device that identifies a customer account for the customer from among a plurality of customer accounts maintained by the server-side business application;
exchanging second messages between the business user using the mobile device and the customer, wherein the second messages represent the audio conversation between the business user and the customer; and
responsive to a determination that the audio conversation between the business user and the customer has ended, automatically, without user intervention, exchanging third messages between the client-side business application and the server-side business application comprising information that causes the server-side business application to instantiate a business object associated with the customer account, the third messages further comprising textual communication details corresponding to a portion of, but not all of, the audio conversation represented by the second messages, wherein at least some of the textual communication details are stored in the business object.

2. The method of claim 1 further comprising receiving input from the business user that identifies the customer associated with the account, wherein exchanging second messages includes the mobile device initiating the exchange of second messages.

3. The method of claim 2 wherein the customer is a user.

4. The method of claim 2 wherein the customer is a machine.

5. The method of claim 1 further comprising receiving input from the business user that identifies the account.

6. The method of claim 1 wherein exchanging second messages includes receiving an incoming communication from an initiating caller.

7. The method of claim 6 further comprising identifying an account among the plurality of accounts maintained by the server-side business application based on the initiating caller.

8. The method of claim 1 further comprising:
identifying another account;
conducting a communication with a contact associated the other account;
instantiating a second business object on the server-side business application that is associated with the other account; and
storing communication details relating to the communication in the second business object.

9. A mobile device comprising:
a processor; and
a memory having stored thereon a client-side business application,
wherein the client-side business application is configured to cause the process to: execute a client-side business application on a mobile device; executing a client-side business application on a mobile device;
responsive to an initiation of an audio conversation through the mobile device by a business user associated with the mobile device to a customer of the business user:
exchanging first messages between the business user of the mobile device and a server-side business application executing on a computer system separate from the mobile device, the first messages including identification information previously provided by the business user of the mobile device that identifies a customer account of the customer from among a plurality of customer accounts maintained by the server-side business application;
exchanging second messages between the business user using the mobile device and the customer using a communication device separate from the mobile device, wherein the second messages represent the audio conversation between the business user and the customer; and
responsive to a determination that the audio conversation between the business user and the customer has ended:
automatically, without user intervention, exchanging third messages between the client-side business application and the server-side business application comprising information that causes the server-side business application to instantiate a business object associated with the account, the third messages further comprising textual communication details corresponding to a portion of, but not all, of the audio conversation represented by the second messages exchanged between the client-side business application and the communication device, wherein at least some of the communication details are stored in the business object.

10. The mobile device of claim 9 wherein the client-side business application is further configured to cause the processor to receive input from the business user that identifies the customer associated with the account, wherein exchanging second messages includes the mobile device initiating the exchange of second messages.

11. The mobile device of claim 10 wherein the customer is a user.

12. The mobile device of claim 10 wherein the customer is a machine.

13. The mobile device of claim 9 the client-side business application is further configured to cause the processor to receive input from the business user that identifies the account.

14. The mobile device of claim 9 wherein the client-side business application is configured to respond to an incoming communication from an initiating caller.

15. The mobile device of claim 14 wherein the client-side business application is further configured to cause the processor to identify an account among the plurality of accounts maintained by the server-side business application based on an identification of the initiating caller.

16. A non-transitory computer readable storage medium having stored thereon computer executable program code configured to be executable by a digital processor, wherein when executed by the digital processor, the computer executable program code causes the digital processor to perform steps of:
   executing a client-side business application on a mobile device;
   responsive to an initiation of an audio conversation through the mobile device by a business user associated with the mobile device to a customer of the business user, wherein the business user is sales person:
      exchanging first messages between the business user of the mobile device and a server-side business application executing on a computer system separate from the mobile device, the first messages including identification information previously provided by the business user of the mobile device that identifies a customer account of the customer from among a plurality of customer accounts maintained by the server-side business application;
      exchanging second messages between the business user using the mobile device and the customer using a communication device separate from the mobile device, wherein the second messages represent the audio conversation between the business user and the customer; and
   responsive to a determination that the audio conversation between the business user and the customer has ended:
      automatically, without user intervention, exchanging third messages between the client-side business application and the server-side business application comprising information that causes the server-side business application to instantiate a business object associated with the account, the third messages further comprising textual communication details corresponding to a portion of, but not all, of the audio conversation represented by the second messages exchanged between the client-side business application and the communication device, wherein at least some of the communication details are stored in the business object.

17. The computer readable storage medium of claim 16 wherein the digital processor further performs a step of receiving input from the business user that identifies a customer associated with the account, wherein exchanging second messages includes the mobile device initiating the exchange of second messages.

18. The computer readable storage medium of claim 16 wherein the digital processor further performs a step of receiving input from the business user that identifies the account.

19. The computer readable storage medium of claim 16 wherein exchanging second messages includes receiving an incoming communication from an initiating caller.

20. The computer readable storage medium of claim 19 the digital processor further performs a step of identifying an account among the plurality of accounts maintained by the server-side business application based on the initiating caller.

* * * * *